Patented Feb. 17, 1942

2,273,780

UNITED STATES PATENT OFFICE 2,273,780

WAX ACRYLATE ESTER BLENDS

Harry R. Dittmar, Wilmington, Del., assignor to E. I. du Pont de Nemours & Company, Wilmington, Del., a corporation of Delaware No Drawing. Application December 30, 1939, Serial No. 311,937

20 Claims. (Cl. 260—28)

This invention relates to coating, film-forming and sealing compositions, and more particularly to such compositions containing a saturated, hydroxy fatty acid ester and a polymeric organic compound. The invention likewise relates to a method of preparing these compositions.

An object of the present invention is to provide a tough and flexible coating composition containing a saturated, hydroxy fatty acid ester and a polymeric higher alcohol ester of acrylic and methacrylic acids. Another object of the invention is to provide a process of preparing a composition of matter containing a blend containing hydrogenated castor oil, a polymeric acrylic or methacrylic acid ester of an alcohol containing more than 2 carbon atoms and a wax. A further object is to provide compositions which are thermo-sealing, tough, elastic, moisture-, water-, and gas-proof of exceptional utility for protecting foodstuffs, potable liquids, or other products subject to dehydration or gaseous deterioration. More specifically, the invention relates to the preparation of a coating or film-forming composition containing hydrogenated castor oil, a polymeric methacrylic acid derivative compatible therewith and a wax such as paraffin. Other objects and advantages of the invention will hereinafter appear.

The surprising discovery has been made that polymeric acrylic and methacrylic acid esters of alcohols containing more than 2 carbon atoms can be blended with saturated, hydroxy fatty acid esters containing at least 12 carbon atoms in the acid molecule to give low melting wax-like compositions. These blends are useful per se and give exceptionally valuable products when combined with various waxes such as paraffin. The three-component compositions have the exceptional property of being molten at such low temperatures that they can be coated on products which are injured by compositions coated at high temperatures. Heretofore, wax compositions containing, for example, the polymeric methacrylic acid esters, could not be applied at temperatures below 150° C., and temperatures above 150° C. are too high for many commercial applications wherein wax melts are used, for example, as in coating paper and food products. The surprising discovery has been made that a wax blend containing polymeric methacrylic acid esters of alcohols containing more than 2 carbon atoms, hydrogenated castor oil and a low-melting paraffin wax can be coated on paper, food products, and the like at temperatures as low as 50° C. By the use of paraffin waxes, having somewhat higher melting points, or other waxes having similar melting points, it is possible to prepare wax melts, for these ingredients, which can be applied at temperatures ranging from 50° to 125° C.

Briefly stated, the above two-component blend, containing a saturated, hydroxy fatty acid ester and a polymeric methacrylic acid ester of an alcohol containing more than 2 carbon atoms, is prepared by first heating the saturated, hydroxy fatty acid ester to a temperature of from approximately 30° to 50° C. above its melting point and preferably below 200° C. and adding thereto with stirring the polymeric methacrylic acid ester. The stirring is continued until the resulting mass becomes substantially homogeneous, whereupon it may then be cast into suitable molds and used for many of the purposes described below. The three-component system is prepared substantially in the same manner except that the saturated, hydroxy fatty acid ester, together with the wax used, is first melted and to this molten mass the polymeric ester is added. While it has been found that the blends are preferably made in accord with the methods herein described, other means of blending the several ingredients and order of adding them may be employed if desired. A fourth component, such as rosin, gutta percha, etc., may be added to further modify the product.

The saturated, hydroxy fatty acid esters, or mixtures thereof, which may be used in preparing these wax blends include primarily, the polyhydric alcohol esters such as the ethylene glycol, propylene glycol, butylene glycol and glycerine, mono- and polyhydroxy stearates, e. g., glycol mono- and dihydroxy stearate, glycerol mono-, di-, and trihydroxy stearate, and the like. Similar esters of dihydroxy stearic acid may likewise be employed such as glycerol mono- and dihydroxy stearate and glycerine tri-dihydroxy stearate. The wax-like glycerol trihydroxy stearate obtained by the hydrogenation of castor oil is particularly useful in the preparation of the two, three or four-component compositions.

The polymeric acrylic and methacrylic acid esters of the straight and branched chain aliphatic alcohols containing more than 2 carbon atoms, or mixtures thereof, which may be combined with the saturated, hydroxy fatty acid esters include, for example, n-propyl, isopropyl, n-butyl, isobutyl, the amyl, octyl, nonyl, and higher esters of arcrylic and methacrylic acid; the polyhydric alcohol esters of acrylic and methacrylic acid, such, for example, as ethylene glycol, glycerol, propylene glycol, butylene glycol, monoacrylates and methacrylates, etc.; and, in general, all methacrylic acid esters of the higher molecular weight alcohols whether saturated or unsaturated, or interpolymers or copolymers thereof, or interpolymers or copolymers thereof with other esters or compounds of the acrylic series, or interpolymers or copolymers thereof with other unsaturated organic compounds such as the vinyl esters, styrene, and neoprene, which are compatible with the aforesaid saturated hydroxy fatty acid esters. In certain cases mixtures of preformed polymers may be used, for example butyl and isobutyl methacrylate polymers.

In addition to, or in place of, the designated polymeric esters, there may be used the lauryl, stearyl, octadecyl and higher imides of acrylic and methacrylic acid and the butyl and higher mono-substituted amides which are compatible with the saturated, hydroxy fatty acid esters and the waxes, if a wax is present.

The waxes or mixtures of waxes which may be used in conjunction with the saturated, hydroxy fatty acid and the polymeric esters, etc., include waxes of a vegetable, animal, synthetic, and/or mineral origin, or mixtures thereof, such as, for example, carnauba, candelilla, montan, lanoline, coca butter, cottonseed stearin, Japan wax, bayberry, myrtle, mace, palm kernel, beeswax, spermaceti, Chinese insect, mutton tallow, waxes obtained by the hydrogenation of coconut oils, soy bean and perhaps of more importance, the mineral waxes such as paraffin, ceresin, montan, ozokerite, etc.

The fourth component, which may be added to further modify the characteristics of the composition; include natural or synthetic rubber or their halogenated products, gutta percha; asphalt; natural and synthetic resins such as damar, cumarone-indene, copal, alkyd resins, rosin, balsams; gelatine, glue; the polymeric resins such as vinyl acetate, vinyl chloride, styrene, etc.; the phenol and urea-formaldehyde resins. Suitable plasticizers may be used, if desired, such for example, as dicyclohexyl phthalate, phthalates of the higher alcohols, the cresyl phosphates, para toluene sulfonamide, dibutyl phthalate, octadecanediol monocarbamate, stearyl carbamate, etc.

The many advantages of my invention are illustrated by the compositions which are given and in which the parts are by weight. They were all prepared by adding the polymeric compound to the other compound or compounds, after the latter compounds had been heated to a molten state. The ingredients, however, may be mixed in any order and if desired the monomer may be polymerized in the presence of the modifying waxes, hydroxy stearates, etc. There are, of course, many forms of the invention other than these specific embodiments, which embodiments do not restrict the scope of my invention.

The blends in Table I have been found to be excellent substitutes for montan wax, particularly for use in rubber compounding. As can be seen from the table, when a methacrylate resin was included in the blend in amounts below 25%, there was no marked change in physical properties, but in amounts of 25% or more the toughness and adhesiveness of the resulting blend was greatly increased.

TABLE I

Hydrogenated castor oil-resin blends

| | Composition | Characteristics |
|---|---|---|
| 1 | 33⅓% hydrogenated castor oil, 33⅓% rosin. 33⅓% n-butyl methacrylate polymer. | Fairly hard, pliable, tan, thin film transparent, slightly tacky, tough. C. T.* 95° C. |
| 2 | 33⅓% hydrogenated castor oil, 33⅓% carnauba wax, 33⅓% isobutyl methacrylate polymer. | Hard, very brittle, light tan, opaque. C. T.* 90° C. |
| 3 | 40% hydrogenated castor oil, 40% ester gum, 20% n-butyl methacrylate polymer. | Hard, very brittle, tan, opaque. C. T.* 80° C. |
| 4 | 50% hydrogenated castor oil, 50% isobutyl methacrylate polymer. | Hard, brittle, white, opaque, soft at 70° C. C. T.* 85° C. |
| 5 | 50% hydrogenated castor oil, 50% n-butyl methacrylate polymer. | Hard, brittle, white, opaque, soft at 70° C. C. T.* 82° C. |
| 6 | 50% hydrogenated castor oil, 25% rosin, 25% n-butyl methacrylate polymer. | Hard, brittle on sharp break, tan, translucent in thin film, fairly tough, soft at 55° C. C. T.* 68° C. |
| 7 | 65% hydrogenated castor oil, 10% rosin, 25% isobutyl methacrylate polymer. | Hard, very brittle, tan, opaque. C. T.* 80° C. |

*Coating temperature, i. e., lowest practical temperature at which the molten blend can be coated by dipping the article to be coated directly into the molten wax.

The blends in Table II are particularly applicable for the coating of paper, inasmuch as they are capable of being applied from the molten state at temperatures below approximately 100° C. and they have generally a gloss superior to that of an unmodified paraffin and are substantially translucent. It was found, in preparing blends of this composition, that the application temperature could be raised in three ways: (1) by using a higher melting paraffin; (2) by using a larger proportion of paraffin to the hydrogenated castor oil; and, (3), by increasing the proportion of the methacrylate polymers. The first method is generally most satisfactory. The second method increases the temperature, and blends of greater toughness and higher gloss are obtained. The third method was particularly successful if both the butyl methacrylate polymer and the hydrogenated castor oil portions were simultaneously increased.

TABLE II

Hydrogenated castor oil-paraffin-resin blends

| | Composition | Characteristics |
|---|---|---|
| 1 | 28.6% hydrogenated castor oil, 28.6% paraffin (135°)**, 28.6% rosin, 14.2% n-butyl methacrylate polymer. | C. T. 55° C., tan, very brittle, slightly tacky. |
| 2 | 28.6% hydrogenated castor oil, 28.6% paraffin (135°), 28.6% ester gum, 14.2% isobutyl methacrylate polymer. | C. T. 65° C., light tan, very brittle, slightly tacky. |
| 3 | 25% hydrogenated castor oil, 25% paraffin (135°), 25% ester gum, 25% n-butyl methacrylate polymer. | C. T. 65° C., light tan, fairly tough, slightly tacky, thin film not brittle. |
| 4 | 25% hydrogenated castor oil, 25% paraffin, 25% ester gum, 25% isobutyl methacrylate polymer. | C. T. 65° C., light tan, very brittle, not tacky. |
| 5 | 33⅓% hydrogenated castor oil, 33⅓% paraffin (135°), 33⅓% n-butyl methacrylate polymer. | C. T. 90° C., white, very brittle, not tacky. |
| 6 | 33⅓% hydrogenated castor oil, 33⅓% paraffin, 33⅓% isobutyl methacrylate polymer. | C. T. 90° C., white, very brittle, not tacky. |
| 7 | 66⅔% hydrogenated castor oil, 33⅓% isobutyl methacrylate polymer. | C. T. 100° C., white, extremely brittle, not tacky. |

TABLE II —*Continued*

*Hydrogenated castor oil-paraffin-resin blends*

| | Composition | Characteristics |
|---|---|---|
| 8 | 25% hydrogenated castor oil, 25% paraffin (143-145°), 25% ester gum, 25% n-butyl methacrylate polymer. | C. T. 85° C., light tan, fair gloss, slightly tough, brittle, not tacky. |
| 9 | 28.6% hydrogenated castor oil, 28.6% paraffin (150°), 14.2% rosin, 28.6% n-butyl methacrylate polymer. | C. T. 100° C., tan, good gloss, fairly tough, brittle, slightly tacky. |
| 10 | 37.5% hydrogenated castor oil, 12.5% paraffin (150°), 25.0% rosin, 25.0% n-butyl methacrylate polymer. | C. T. −80° C., tan, very brittle, not tacky. |
| 11 | 33⅓% hydrogenated castor oil, 33⅓% paraffin (150°), 33⅓% n-butyl methacrylate polymer. | C. T. −115° C., white, fair gloss, brittle, not tacky. |
| 12 | 28.6% hydrogenated castor oil, 28.6% paraffin (135°), 42.8% n-butyl methacrylate polymer. | C. T. −100° C., white, fairly tough, slightly brittle, not tacky, thin film not brittle. |

**Melting point of the paraffin in °F.

The two, three or four-component compositions of the invention can be used for many purposes such, for example, as a coating composition for the treatment of fibrous materials such as cloth, paper, leather; films or filaments of regenerated cellulose, cellulose acetate, cellulose nitrate, or ethyl cellulose; linoleum, oil cloth, wall board; for the coating of cellular materials such as cement, stone, bricks and the like; for the treatment of more dense materials such as wood, glass and metals, or upon materials such as lace, wire screen, etc. By proper control of the composition, it is possible to obtain a coating composition which may be applied to fibrous materials in the form of a molten liquid which may be of such viscosity that it will not strike through the material treated or, contrariwise, if greater penetration is desired, the ratio of wax may be increased to such an extent that substantial penetration of the fibrous material may be effected.

These compositions as films or coated on paper may also be used for wrapping foodstuffs and other materials requiring a moisture-, water- and/or gas-proof protective coating. After wrapping, the overlapping edges may be sealed by applying an iron heated to the proper temperature to fuse the edges together. For coating cheese, fruit, vegetables or materials which require a close, contiguous, protective film, highly successful coatings may be applied by dipping the material, cold or in the molten composition. This provides an excellent protective coating which can be removed easily.

The compositions of the invention may be dissolved in a suitable solvent or combination of solvents with or without plasticizers and as such may be applied to the surface to be coated. If desired, the formed blend may be dispersed, while in the molten state, by means of a dispersing agent into a non-solvent, e. g., water, to form an emulsion and the blend applied in that form.

Uses recommended for these compositions include the following:

They are well adapted for the coating of paper to be used as an insulating material, for the wrapping of bread, flowers, etc., for the fabrication of food containers such as paper cups and the like, as a thermoplastic adhesive, for the wrapping of cartridges, for use as labels and as a dielectric, e. g., in electric condensers. The compositions likewise may be used for the coating of flexible materials, such as wire, silk, cotton, wool, and the like, and in making oiled silk like products, chintz, semi-chintz and sized and water-repellent fabrics of all kinds.

As has been indicated, foodstuffs may be dipped in the molten blend to form a protective coating thereover which may likewise be applied by brushing, spraying, or otherwise applying the composition to the surfaces of the foodstuffs, such, for example, as meat, cheese, fruits, vegetables, nuts and the like.

Rigid objects may likewise be coated to protect them from indoor or outdoor exposure, and for this purpose the products of this invention may be applied, by dipping in the molten composition or by spraying, brushing or dipping a solution or emulsion, to wood or metal, e. g., to the interior of beer cans, metal cans for preserving foods and the like. Stone, concrete, synthetic plastics, tile, plaster, and brick may be similarly treated. Regenerated cellulose film may be coated to render the non-moisture proof grade moisture proof or to alter the flexibility of sheets for application to various uses.

Due to the excellent electrical insulating properties of the compositions, they are exceptionally well adapted for the treating of electric wires, coils, armatures and rotors, and likewise for the treatment of paper insulation to be used in winding condensers and for the final impregnation of the wound condenser.

Floors and floor coverings may be protected, preserved and beautified by the use of these compositions, they being well adapted for application to linoleum, wood and tile. They can be applied as emulsions to give self-polishing waxes for floors, furniture, etc. As coating compositions, they are likewise suitable for the treatment of leather or botanical and biological exhibits for obtaining desirable surface effects and preservation.

As adhesives the polymeric methacrylic acid derivative-wax blends may be applied as a melt, solution, emulsion, or as an unsupported or supported film, and may be used for joining or laminating any combination of the following materials: wood, stone, paper, cloth, regenerated cellulose film, leather, metal, rubber, glass, synthetic resins, cellulose derivatives and cork.

The tough, abrasion-resistant compositions of the invention find utility in polishes and waxes used for polishing automobiles, furniture, shoes and the like. Because of the ease with which they may be cast, molded or cold pressed, they may be formed into shaped articles by pouring melts thereof into forms, by injection or compression molding or by cold pressing to produce shaped articles or to take impressions, as in dental uses.

When used for the impregnation of porous rigid materials such as wood, stone, plaster and the like, they may be applied from solution or emulsion, or as a melt; or, if desired, a solution of the wax containing the monomeric methacrylic derivative may be applied, followed by subsequent polymerization of the resin, in situ, by raising the temperature to the proper degree.

Emulsions of the methacrylic polymer blends are likewise applicable to the sizing of paper, as a pigment adhesive, as a size to control paste penetration of labels, to effect the moisture proofing of paper bags, paper carton liners, cardboard and the like and for addition to insecticides as an extender and fixative. The emulsions may be made by melting the blend adding a dispersing agent such as soap, Turkey red oil, etc., and very slowly adding the mixture to water which is at a temperature above the melting point of the blend, the water being constantly agitated during the addition and if desired the resulting product may be passed through a colloid mill.

Due to the unusual strength of the compositions, it is possible to use them as supported or unsupported films which may be prepared by pouring a melt of the blend upon a suitable base material followed by stripping and rolling up the thus stripped film. If a supported film is required, the stripped film is superimposed upon a support such as paper, rubber, cloth or other suitable supporting material. The films may likewise be formed by extruding the molten material through slits into a cold, non-solvent bath or into a refrigerated room or by cold-rolling or stretching a block of the composition to the desired film thickness.

Supported or unsupported films prepared as above described are useful for the wrapping of materials, as tree-grafting tape, for insulation, as thermoplastic adhesives, for surface layers calendered on paper, cloth, rubber and the like, and for therapeutic uses to prevent drying out of wounds, surgical dressings and the like.

For the above applications, the polymeric methacrylic acid derivative-wax blends may be suitably modified with pigments, fillers, dyes, and/or plasticizers, resins and the like. Moreover, these blends may be added in suitable amounts to paraffin after its extraction from petroleum oils, whereby the quality of the wax may be controlled and blistering and the growth of large crystals prevented.

An outstanding characteristic of these methacrylate wax blends appears to be that, particularly when the bond is made by applying heat, an excellent seal results. Although bonding of this type may be carried out at temperatures well below the point at which the polymeric methacrylic acid derivative present will seal with itself, an excellent bond is obtained which makes it possible to apply the methacrylate-wax blends as bonding materials to give an exceedingly firm bond which heretofore required the application of exceptionally high temperatures and the use of expensive raw materials.

In consideration of the above specification, it will be realized that many changes may be made in the details therein given without departing from the scope of the invention or sacrificing any of the advantages that may be derived therefrom.

I claim:

1. A process which comprises heating and thoroughly mixing per 100 parts by weight of the mixture at least 25 parts by weight of a saturated, hydroxy fatty acid ester containing at least twelve carbon atoms with at least 20 parts by weight of a polymeric compound of the group consisting of the acrylic and methacrylic acid esters of the aliphatic alcohols containing more than 2 carbon atoms.

2. The process of claim 1 in which the saturated, hydroxy fatty acid ester is hydrogenated castor oil.

3. A process which comprises heating per 100 parts by weight of the mixture at least 25 parts by weight of a saturated, hydroxy fatty acid ester containing at least twelve carbon atoms with at least 20 parts by weight of a polymeric compound of the group consisting of acrylic acid and methacrylic acid esters of the aliphatic alcohols containing more than 2 carbon atoms and a wax until the mixture becomes substantially homogeneous.

4. The process of claim 3 in which the wax is a mineral wax.

5. The process of claim 3 in which the wax is a paraffin wax.

6. A process which comprises heating per 100 parts by weight of the mixture at least 25 parts by weight of an ester of a hydroxy stearic acid with at least 20 parts by weight of a polymeric compound of the group consisting of the acrylic and methacrylic acid esters of the aliphatic alcohols containing more than 2 carbon atoms until the resulting mixture is substantially homogeneous.

7. A process which comprises heating per 100 parts by weight of the mixture at least 25 parts by weight of an ester of a hydroxy stearic acid with at least 20 parts by weight of a polymeric compound of the group consisting of the acrylic and methacrylic acid esters of the aliphatic alcohols containing more than 2 carbon atoms, and a wax until the mixture is substantially homogeneous.

8. A process which comprises heating per 100 parts by weight of the mixture at least 25 parts by weight of a hydroxy stearic acid ester of a polyhydric alcohol with at least 20 parts by weight of a polymeric compound of the group consisting of acrylic and methacrylic acid esters of aliphatic alcohols containing more than 2 carbon atoms and a wax until the mixture is substantially homogeneous.

9. A process which comprises heating per 100 parts by weight of the mixture at least 25 parts by weight of hydrogenated castor oil with at least 20 parts by weight of a polymeric compound of the group consisting of acrylic and methacrylic acid esters of aliphatic alcohols containing more than 2 carbon atoms and a wax until the resulting mixture becomes substantially homogeneous.

10. A process which comprises heating to its melting point a mixture containing per 100 parts by weight of the mixture a wax and at least 25 parts by weight of an ester containing at least twelve carbon atoms of a saturated, hydroxy fatty acid and subsequently adding to the resulting molten composition at least 25 parts of a polymeric compound of the group consisting of acrylic and methacrylic acid esters of aliphatic alcohols containing more than 2 carbon atoms and stirring the resulting mixture until it is substantially homogeneous.

11. A blend which contains per 100 parts by weight thereof at least 25 parts by weight of a saturated hydroxy fatty acid ester containing from 10 to 20 carbon atoms in the acid molecule and at least 25 parts by weight of a polymeric compound of the group consisting of acrylic and methacrylic acid esters of aliphatic alcohols containing more than 2 carbon atoms.

12. A blend of claim 11 containing a wax.

13. A blend which contains per 100 parts by weight thereof at least 25 parts by weight of a hydroxy stearic acid ester of a polyhydric alcohol and at least 25 parts by weight of a polymeric compound of the group consisting of acrylic acid and methacrylic acid esters of aliphatic alcohols containing more than 2 carbon atoms.

14. A blend which contains per 100 parts by weight thereof at least 25 parts by weight of glycerol trihydroxystearate and at least 25 parts by weight of a polymeric compound of the group consisting of acrylic acid and methacrylic acid esters of aliphatic alcohols containing more than 2 carbon atoms.

15. A blend which contains per 100 parts by weight thereof at least 25 parts by weight of hydrogenated castor oil and at least 25 parts by weight of a polymeric compound of the group consisting of acrylic acid and methacrylic acid esters of aliphatic alcohols containing more than 2 carbon atoms.

16. A blend of claim 15 containing a mineral wax.

17. A wax-polymer blend containing per 100 parts at least 25 parts by weight of hydrogenated castor oil and at least 25 parts by weight of polymeric n-butyl methacrylate.

18. A wax-polymer blend containing per 100 parts at least 25 parts by weight of hydrogenated castor oil, at least 25 parts by weight of polymeric n-butyl methacrylate and at least 12½ parts by weight of paraffin wax.

19. A wax-polymer blend containing per 100 parts at least 25 parts by weight of hydrogenated castor oil, at least 25 parts by weight of polymeric iso-butyl methacrylate, and at least 12½ parts by weight of paraffin wax.

20. A wax-polymer blend containing by weight 37.5% hydrogenated castor oil, 25% rosin, 25% polymeric n-butyl methacrylate, and 12.5% paraffin.

HARRY R. DITTMAR.

CERTIFICATE OF CORRECTION.

Patent No. 2,273,780.                                  February 17, 1942.

HARRY R. DITTMAR.

It is hereby certified that error appears in the printed specification of the above numbered patent requiring correction as follows: Page 2, first column, line 7, for "arcrylic" read --acrylic--; and that the said Letters Patent should be read with this correction therein that the same may conform to the record of the case in the Patent Office.

Signed and sealed this 21st day of April, A. D. 1942.

(Seal)                                        Henry Van Arsdale,
                                             Acting Commissioner of Patents.